No. 849,790. PATENTED APR. 9, 1907.
J. W. JACKSON.
PROCESS OF CURING CONCRETE BLOCKS.
APPLICATION FILED JULY 12, 1906.
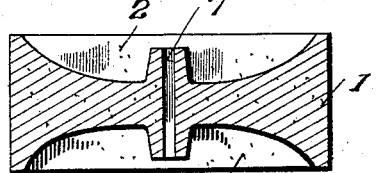
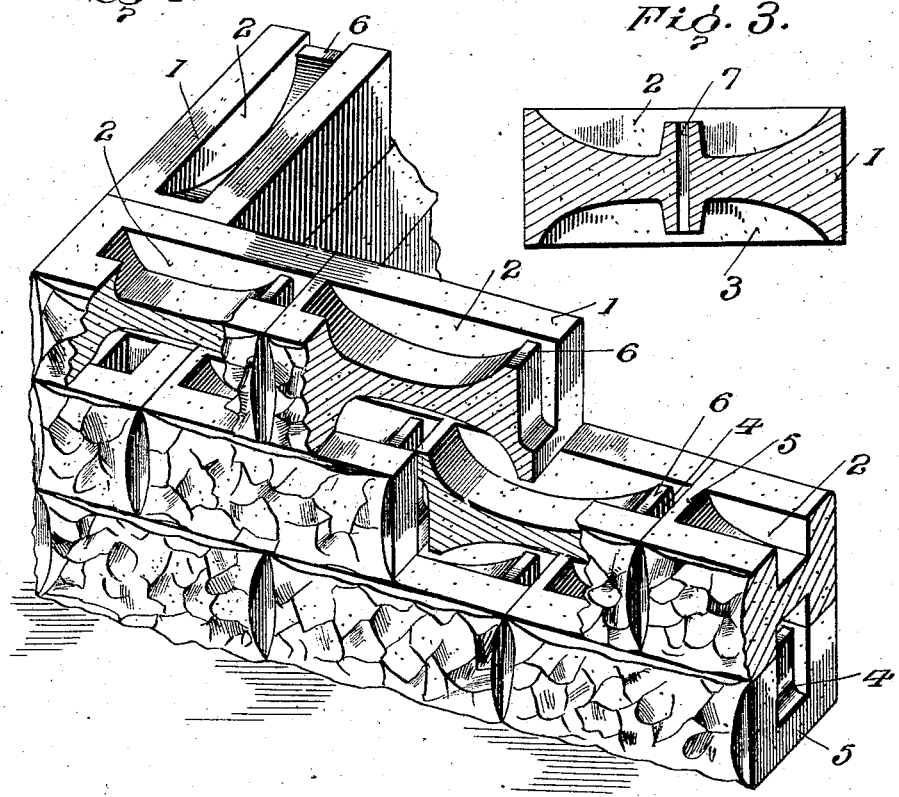
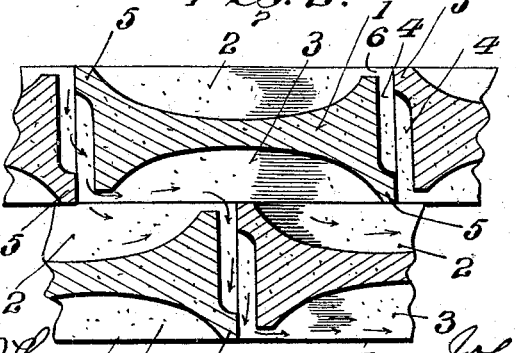

UNITED STATES PATENT OFFICE.

JOHN W. JACKSON, OF RICHMOND, VIRGINIA.

PROCESS OF CURING CONCRETE BLOCKS.

No. 849,790.          Specification of Letters Patent.          Patented April 9, 1907.

Application filed July 12, 1906. Serial No. 325,925.

*To all whom it may concern:*

Be it known that I, JOHN W. JACKSON, of Richmond, Virginia, have invented a new and useful Improvement in Processes of Curing Concrete Blocks, which improvement is fully set forth in the following specification.

The present invention relates to concrete blocks, and has for its object to provide an improved process for simply, effectively, and in a highly-economical manner curing the block, or, in other words, causing the perfect setting of the cement.

In order to obtain the best results in the manufacture of concrete blocks, it is recognized that the blocks must be kept wet while the cement is setting, and, further, it has been found much more desirable to mold the blocks with the material containing as little moisture as possible, so that the blocks may be removed from the molds as soon as they are formed, for if the mixture is in a wet condition when molded the blocks will have to remain in the molds until they have set. Further, when the mixture is molded in a comparatively dry state less cement is necessary, for the particles of sand and aggregate may be tamped much closer together than when in a wet condition, thus requiring the use of less cement. This being so, it is customary in the manufacture of concrete blocks to mold the material in a dry state and afterward cure the blocks by keeping the same well soaked with water, and if a block formed of a nearly-dry mixture is kept well saturated with water for several days after it is molded it will assume a degree of hardness and density greater than if the material had been molded in a wet condition; but if the moisture is not applied constantly and properly the block will never assume a satisfactory state of hardness, but will be porous and lack density. Accordingly this step of curing is a very important one, as more failures have been caused from improper curing than all other causes combined. One common method of effecting the desired result is to keep the blocks in vats or tanks of water for several days from the time they take their initial set. Another is to keep the blocks covered with wet cloths, sand, or other material that will hold moisture; but all of these methods are open to objections, the principal one being that they are expensive, and my improved process is addressed particularly to the more economical, simple, effective, and expeditious curing of the blocks.

My process is applicable only to a block having a water-receiving recess in one of its faces and provided with an overflow-conduit conducting the water from said recess to a point below the block. By hacking such blocks in the usual way—*i. e.*, by breaking of joints, as is customary in hacking bricks, blocks, and such structures—the water-receiving recess in one block may be placed where the overflow from the block above will fall into the recess of the lower block, which in turn when it is filled to the overflow-point will permit the water through its overflow-recess to fill the recess of the block beneath it, and so on to the bottom of the hack.

Briefly stated, then, my process consists in hacking blocks provided with a recess in one of the faces of each block with such recessed faces turned upward and in such a manner as to leave an open overflow-conduit leading from the recess of one block to the recess of the block beneath it and then filling the recesses in all the blocks with water by causing the water to overflow from the upper tier of blocks by way of said conduits to the recesses of the blocks in the tiers beneath.

By reason of the porous condition of the blocks the water retained in the recesses percolates through the entire block, and the amount contained in the recess will at first be absorbed in a very short time, when the supply of water may be readily replenished by simply directing water through a hose or otherwise upon the upper tier of blocks, when the overflow will cause the recesses in all of the other blocks to be filled to the overflow-point. This process therefore greatly facilitates the supply of the proper amount of moisture to the blocks, and as this supply has to be replenished several times a day for a number of days—say from six to ten days—it will be perceived that my process of supplying the moisture without any additional handling of the blocks after they are once hacked greatly cheapens the process. Moreover, it has been found that by thus supplying the moisture to the block and leaving it to cure in the air a block of very superior quality is obtained, the curing having been perfectly effected.

Any suitable construction of block whereby a water receiving and retaining recess is formed in one of the faces of the block and an overflow-conduit is provided leading downward may be employed. In the accompanying drawings I have shown two forms of block suitable for use in the practice of my novel process; but it will be understood that these forms of blocks are herein shown merely for the purpose of illustrating the process and that the practice of the process is not limited to such forms of block, it only being necessary that the blocks be so constructed that when piled into a hack there shall be an uninterrupted conduit from the recessed faces of the upper tier of blocks in the hack to the recessed faces of the blocks in the lower tier.

In the drawings referred to, Figure 1 is a broken perspective view of blocks hacked up, which blocks are so constructed as to afford the desired recesses and conduits. Fig. 2 is a vertical section through a hack using blocks of the construction shown in Fig. 1, and Fig. 3 illustrates another form of block equally applicable for practicing my invention.

Referring to Figs. 1 and 2 of the drawings, it will be seen that each face of the block is shown with a depression formed therein, the upper face having a depression 2 and the lower face being provided with a like depression 3. In each case an end wall of the depression is provided with a cut-away portion 6, communicating with a cut-away portion 4, formed in one end of the wall, which cut-away portion, however, does not extend entirely from top to bottom of the block, but only a part, here shown as about three-fourths of the distance, leaving a portion 5, which is useful as forming a grip or ledge under which the fingers may be inserted to lift the block when placing it in position in the hack or block. The cut-away portion 6 and the recess 4 in the end wall constitute an overflow-conduit, through which when the water has risen in the recess 2 to the height of the cut-away portion 6 it will overflow and be conducted downward via the recess 4.

In Fig. 3 the overflow from the recess 2 is centrally disposed instead of being at one end, the recess 4 and cut-away portion 6 being omitted and a downwardly-extending conduit 7 being provided in a mid-rib or conical part extending upward within the recess.

As in the constructions shown each side of the block is precisely the same and each end is the same, it is immaterial when placing the block in the hack or wall which side becomes the upper side and which the lower side.

In practicing the curing process of the present invention the blocks are constructed into any suitable hack—as, for example, that shown in Figs. 1 and 2—they being placed so as to break joints, and when so hacked water is placed in the upper recesses 2 of the upper tier of blocks in any suitable way, as from a hose. When the recesses 2 become filled, the water overflows at the cut-away portion 6 and down through the recess 4, which throughout a greater portion of its length registers with a corresponding recess 4, extending upward from the lower face of the adjacent block, thereby affording a direct conduit from the recess 2 in the upper block to the corresponding recess 2 in the block of the tier immediately beneath it when it becomes filled to overflowing and delivers the water to the corresponding conduit and from thence to the recesses 2 of the blocks of the next lower tier, and so on throughout the entire hack. A little study of the hack, as shown in Fig. 1, will make it clear that all the operator has to do is to pour the water in the recesses 2 of the blocks of the upper tier of the hack and need not give his attention in any way whatsoever to the other tiers, since they will have the upper recesses of all the blocks filled from above.

Preferably the blocks are filled with water several times during the day when they are first formed without being hacked, after which they will quite firmly have taken their initial set and may then be hacked up and treated in the manner above indicated. On the other hand, in some cases it may be found desirable to hack the blocks up immediately after they are manufactured; but in either case the process of curing by filling the recesses from the upper tier downward through the succeeding tiers will be the same. After the blocks are hacked up it will be found necessary to supply water to them several times a day for a period of from six to ten days, at which time they will be found to have become firmly set and formed into a hard and dense mass. Preferably the block is then tested to determine whether it is waterproof to a commercial extent by filling the depression 2 with water. If the block holds the water twenty-four hours without absorption, it may be regarded as ready for the market.

It will be observed that my improved process is exceedingly simple and inexpensive and affords the requisite supply of water for effecting the complete curing of the block with the minimum amount of labor.

What is claimed is—

1. The process of curing concrete blocks having a recess in one side of each block adapted to receive and retain water to an overflowing-point, consisting in placing said blocks in such position as to admit of water being placed in said recesses and keeping said blocks in a moist condition while curing by replenishing the supply of water in said recesses.

2. The process of curing concrete blocks having a recess in one face of each block adapted to receive water and an overflow-conduit to said recess, consisting in placing said blocks with their recessed sides turned upward and the overflow-conduit in position to convey an overflow of water to a plinth beneath said block and securing a superior adherence of said blocks by replenishing the supply of water in said recesses.

3. The process of curing concrete blocks having a recess in one face of each block, which consists in hacking the blocks with their recessed faces turned upward and with an open overflow-conduit leading from the recess of one block to the recess of the block beneath it and then filling the recesses in all the blocks with water by causing the water to flow from the upper tier of blocks by way of said conduits to the recesses of the blocks in the lower tiers.

4. The process of curing concrete blocks having a recess in one face of each block, which consists in hacking the said blocks with their recessed faces turned upward and with an open overflow-conduit leading from the recess of one block to the recess of the block beneath it and then filling the recesses in all the blocks with water by causing the water to flow from the upper tier of blocks by way of said conduits to the recesses of the blocks in the lower tiers, and replenishing the supply of water in the recesses of the blocks in said tiers.

In testimony whereof I have signed this specification in the presence of two subscribing witnesses.

JNO. W. JACKSON.

Witnesses:
O. A. HAWKINS,
AUG. MOLL.